United States Patent [19]

Ishizuka

[11] Patent Number: 4,714,892
[45] Date of Patent: Dec. 22, 1987

[54] DIFFERENTIAL PHASE SHIFT KEYING DEMODULATOR

[75] Inventor: Keiji Ishizuka, Tokyo, Japan

[73] Assignee: Canon Kabushiki Kaisha, Tokyo, Japan

[21] Appl. No.: 890,832

[22] Filed: Jul. 25, 1986

[30] Foreign Application Priority Data

Aug. 2, 1985 [JP] Japan .................................. 60-169676

[51] Int. Cl.$^4$ ............................................ H04L 27/22
[52] U.S. Cl. ...................................... 329/50; 329/104; 329/137; 329/145; 375/82; 375/84; 375/94
[58] Field of Search .................. 329/50, 104, 137, 145; 375/82, 84, 94

[56] References Cited

U.S. PATENT DOCUMENTS 4,628,271 12/1986 Takayama ........................ 329/104 X Primary Examiner—Eugene R. Laroche
Assistant Examiner—Robert J. Pascal
Attorney, Agent, or Firm—Toren, McGeady & Associates

[57] ABSTRACT

A differential phase shift keying demodulator for demodulating a signal modulated by differential phase shift keying is arranged to compare the modulated signal with a delayed modulated signal at different points of time within a period required for transmitting one bit of data.

11 Claims, 3 Drawing Figures

DIFFERENTIAL PHASE SHIFT KEYING DEMODULATOR

BACKGROUND OF THE INVENTION

1. Field of the Invention

This invention relates to a differential phase shift keying demodulator.

2. Description of the Related Art

For a video signal recording apparatus, it is known to obtain a modulated data signal (hereinafter referred to as DPSK signal) by differential phase shift keying (DPSK) such a data signal, that represents a photographing data or some comments, with a frequency which is an integer times, for example 13 times, as high as a horizontal synchronizing signal, used as a carrier; and to frequency multiplex the modulated signal together with a video signal in recording the video signal.

FIG. 1 of the accompanying drawings shows the conventional circuit arrangement which is arranged to demodulate the above-stated DPSK signal. The circuit arrangement includes a synchronizing signal separating circuit 14; a timing pulse generating circuit 15; a shift register 16; an exclusive OR gate 17; a low-pass filter 18 (hereinafter referred to as LPF); and a latch circuit 19. A terminal 1 is arranged to receive the DPSK signal; a terminal 2 to receive clock pulses; and another terminal 3 to receive a video signal with which the DPSK signal is synchronized. With these signals respectively supplied to these input terminals, an exclusive logical sum of the DPSK signal, which is delayed by the shift register 16, and the DPSK signal which is not delayed is produced at the putput of the exclusive OR gate 17. Phase detection is thus carried out. A detection signal which is thus obtained is supplied to the LPF 18 to have the carrier component thereof removed. The output of the LPF 18 is latched at the latch circuit 19. Then, in accordance with timing pulses coming from the timing pulse generating circuit 15, a demodulated data signal is produced from a terminal 4 at every one data bit transmitting period.

The conventional demodulator which is arranged in this manner has presented a problem in arranging it into an IC, because a portion of it including the LPF 18 must be externally arranged. This increases the size of the circuit and results in an increase in the price of the demodulator.

Further, in cases where an adverse effect of external noises comes to appear at a timing for latching, it sometimes becomes difficult to accurately demodulate the modulated signal.

SUMMARY OF THE INVENTION

It is an object of this invention to provide a differential phase shift keying demodulator which is capable of solving the problem mentioned in the foregoing.

It is another object of this invention to provide a differential phase shift keying demodulator which permits the whole circuit to be arranged in the form of an integrated circuit for reduction in size and cost thereof.

It is a further object of this invention to provide a differential phase shift keying demodulator which is capable of highly accurately carrying out demodulation.

Under these objects, a differential phase shift keying demodulator embodying this invention comprises: delay means for delaying a modulated signal; comparison means for comparing a signal produced from the delay means with the modulated signal; producing means capable of producing in parallel the outputs of the comparison means which are related to the modulated signal obtained at different time points within a transmission period for one bit of the modulated signal; and output means for producing one demodulated signal by using all the outputs of the comparison means which are produced from the producing means.

The above and further objects and features of this invention will become apparent from the following detailed description of embodiments thereof taken in conjunction with the accompanying drawings.

DETAILED DESCRIPTION OF THE PREFERRED EMBODIMENTS

Figure 1:
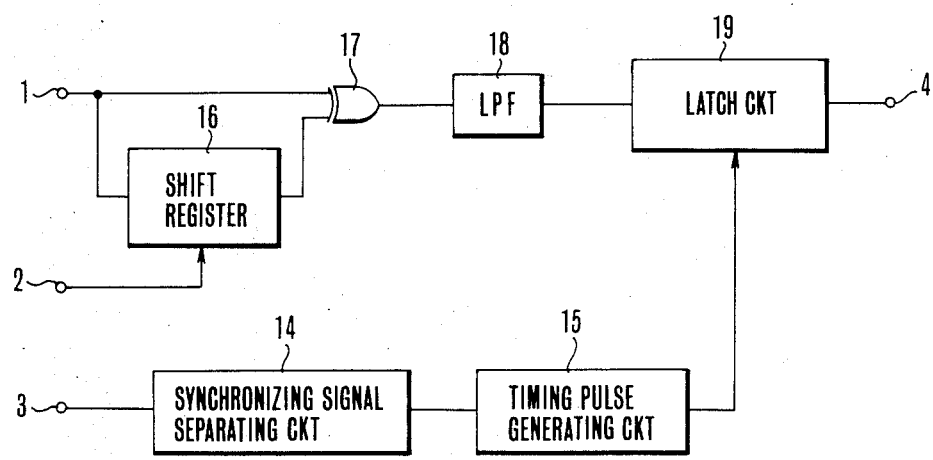
FIG. 1 is a diagram showing the arrangement of a conventional differential phase shift keying demodulator.
Figure 2:
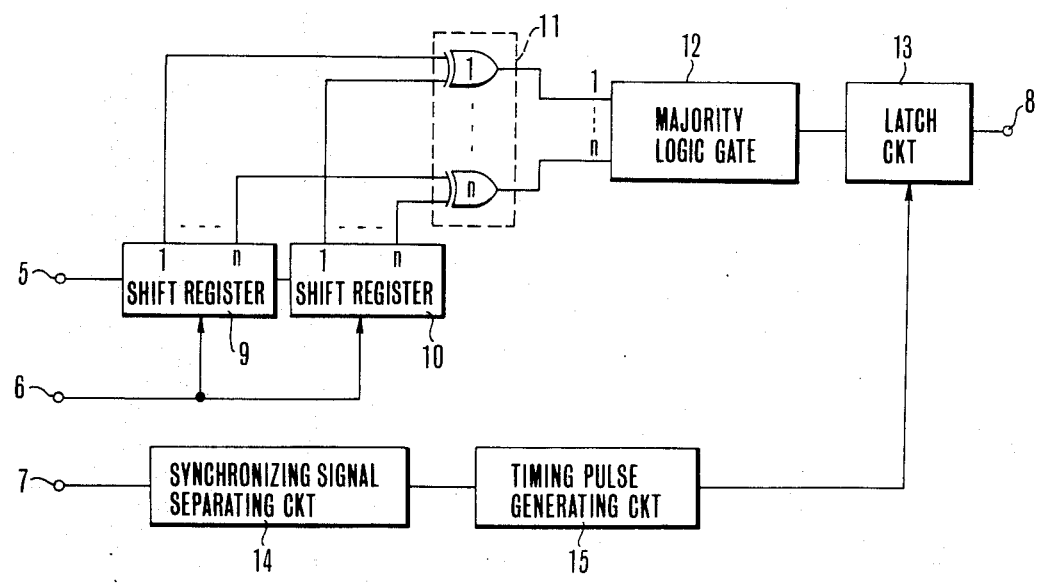
FIG. 2 is a diagram showing the arrangement of a differential phase shift keying demodulator arranged according to this invention as an embodiment thereof.

FIG. 2 shows the arrangement of a differential phase shift keying demodulator as an embodiment of this invention. Terminals 5, 6 and 7 correspond to the terminals 1, 2 and 3 of FIG. 1, respectively. Shift registers 9 and 10 are arranged to have a number of steps "n" which coincides with the number of clock pulses obtained during a period required for transmitting one bit of data. A logic circuit 11 consists of the "n" number of two-input exclusive OR gates and is arranged to obtain the same number of exclusive logical sums as the number of steps of the shift registers 9 and 10 when an incoming signal is delayed as much as the one-data-bit transmitting period by the shift registers 9 and 10. A majority logic gate 12 is arranged to produce its output at a high level when more than half of the "n" number of binary inputs thereof are at a high level and to produce its output at a low level when less than half of the "n" number of inputs are at a high level. A reference numeral 13 denotes a latch circuit. Further, in FIG. 2, the parts which are similar to those shown in FIG. 1 are indicated by the same reference numerals.

The demodulator which is arranged as described above operates as follows: Phase detection is performed on the output of each stage of the shift registers 9 and 10 by obtaining an exclusive logical sum of the delayed modulated signal and the non-delayed modulated signal. Then, noise components are removed through the majority logic gate 12. The output of the majority logic gate 12 is supplied to the latch circuit 13 and is then taken out according to timing pulses produced from the timing pulse generating circuit 15 at a timing corresponding to the one-data-bit transmitting period. By this, a demodulated signal is obtained. The majority logic gate 12 involves a great amount of probability element. Therefore, depending on the S/N ratio of the incoming signal, the number of inputs may be reduced as long as they are available in a plural number.

Figure 3:
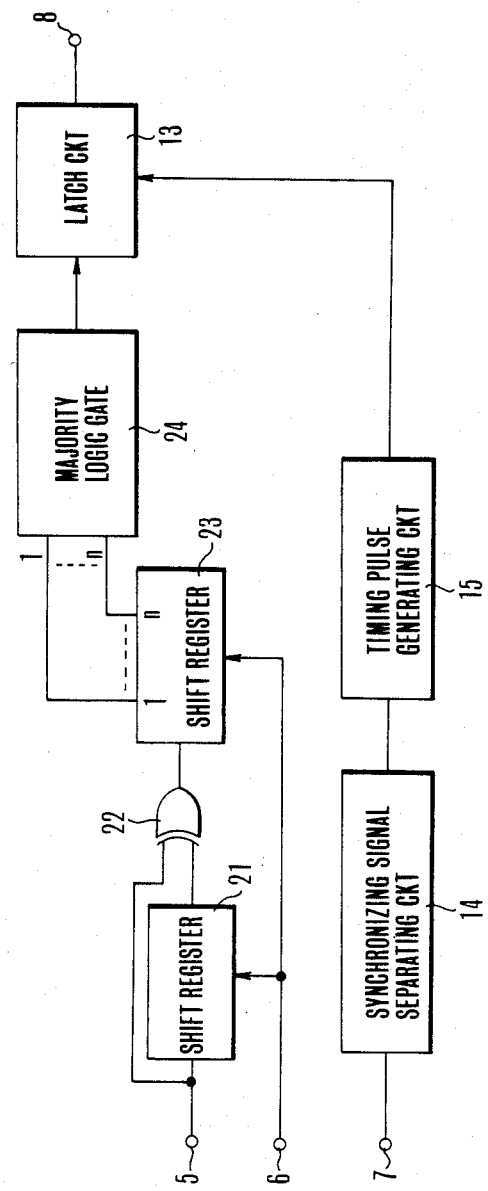
FIG. 3 is a diagram showing a differential phase shift keying demodulator arranged as another embodiment of this invention.

FIG. 3 shows the arrangement of a demodulator as another embodiment of this invention. The parts similar to those shown in FIG. 2 are indicated by the same reference numerals and the details of them are omitted from the following description: Referring to FIG. 3, shift registers 21 and 23 are each arranged to delay the incoming signal as much as a one-data-bit transmitting period. The shift register 21 and an exclusive OR gate 22 operate in the same manner as the shift register 16 and the exclusive OR gate 17 of FIG. 1. The shift register 23 has an "n" number of stages and delays the output of the exclusive OR gate 22 as much as the one-data-bit transmitting period. A majority logic gate 24 is arranged to produce its output at a high level when more than half of the binary outputs of the "n" number of stages of this shift register 23 are at a high level or produces its output at a low level when they are at a low level. Accordingly, in the same manner as in the case of FIG. 2, noise components are removed by the majority logic gate 24.

In accordance with this invention, as described in the foregoing, the LPF of the conventional demodulator can be replaced with a digital circuit, so that a circuit which is capable of performing the same function as that of the conventional circuit arrangement can be arranged completely in the form of an integrated circuit.

Further, since the demodulator according to this invention remains unaffected by any external noises, demodulation can be accomplished at a very high degree of precision.

What is claimed is:

1. A differential phase shift keying demodulator, comprising:
   (a) delay means for delaying a modulated signal;
   (b) comparison means for comparing a signal produced from said delay means with said modulated signal;
   (c) producing means capable of producing in parallel outputs of said comparison means which are related to said modulated signal obtained at different points of time within a transmission period for one bit of said modulated signal; and
   (d) output means for producing one demodulated signal based on all the outputs of said comparison means which are produced from said producing means.

2. A demodulator according to claim 1, wherein said producing means includes a first shift register, having stages, which is arranged to receive said modulated signal and a second shift register, also having stages, which is arranged to receive the output signal of said delay means; and said producing means is arranged to produce an output of each of the stages of said first shift register and an output of each of the stages of said second shift register, respectively.

3. A demodulator according to claim 2, wherein said comparison means includes a plurality of comparison circuits which are respectively arranged to compare the outputs of the stages of said first shift register with the outputs of the stages of said second shift register.

4. A demodulator according to claim 3, wherein each of said plurality of comparison circuits includes an exclusive OR circuit.

5. A demodulator according to claim 3, wherein said output means includes a circuit which is arranged to produce a binary signal on the basis of a majority of binary signals produced from said plurality of comparison circuits.

6. A demodulator according to claim 2, wherein said first and second shift registers are connected in series; and said delay means includes said first shift register.

7. A demodulator according to claim 1, wherein said producing means includes a shift register having stages which is arranged to receive the output signal of said comparison means and to produce the output of each of the stages thereof.

8. A demodulator according to claim 7, wherein said output means includes a circuit which is arranged to produce one binary signal on the basis of the majority of binary signals produced from the stages of said shift register.

9. A demodulator according to claim 1, wherein the delay time of said delay means is equal to the transmission period for one bit of said modulated signal.

10. A differential phase shift keying demodulator comprising:
    (a) a first shift register, having stages, to which a modulated signal is supplied;
    (b) a second shift register, having stages, which is connected in series to said first shift register;
    (c) a plurality of comparison means which are respectively arranged to compare output signals of the stages of said first shift register with output signals of the stages of said second shift register, said plurality of comparison means being arranged to produce binary signals, respectively; and
    (d) means for forming a demodulated signal on the basis of a majority of a plurality of the binary signals produced from said plurality of comparison means.

11. A differential phase shift keying demodulator comprising:
    (a) delay means for delaying a modulated signal;
    (b) comparison means for comparing the output signal of said delay means with said modulated signal, said comparison means being arranged to produce a binary signal;
    (c) a shift register having stages to which said binary signal produced from said comparison means is supplied; and
    d) means for forming a demodulated signal on the basis of a majority of output signals of the stages of said shift register.

* * * * *